United States Patent [19]

Gietl

[11] Patent Number: 4,808,051
[45] Date of Patent: Feb. 28, 1989

[54] SCREW, PARTICULARLY WOOD SCREW

[76] Inventor: Hans Gietl, Rodinger Strasse 1, 8490 Cham-Janahof, Fed. Rep. of Germany

[21] Appl. No.: 39,010

[22] Filed: Apr. 15, 1987

Related U.S. Application Data

[63] Continuation of Ser. No. 750,326, Jun. 28, 1985, abandoned.

[30] Foreign Application Priority Data

Jul. 10, 1984 [DE] Fed. Rep. of Germany ....... 3425380

[51] Int. Cl.⁴ ............................................. F16B 35/00
[52] U.S. Cl. .................................. 411/378; 411/399; 403/408.1; 217/65; 52/217
[58] Field of Search ............... 411/378, 415, 412, 424, 411/455, 386, 387, 394, 402, 411, 482, 487, 504, 510, 911, 384, 399, 423, 414; 403/408.1, 388, 118, 343, 406.1; 52/483, 126.1, 126.7, 217; 217/5, 36, 65; 49/505

[56] References Cited

U.S. PATENT DOCUMENTS

| | | | |
|---|---|---|---|
| 364,301 | 6/1887 | Rogers | 411/455 X |
| 470,804 | 3/1892 | Jones | 411/424 |
| 676,240 | 6/1901 | Latty | 411/424 |
| 1,705,086 | 3/1929 | Ferguson | 411/378 |
| 2,016,610 | 10/1935 | Moeller . | |
| 2,024,071 | 10/1935 | Taylor et al. . | |
| 2,690,879 | 10/1954 | Snyder | 411/455 X |
| 3,109,691 | 11/1963 | Burkhardt | 411/412 X |
| 3,667,338 | 6/1972 | Johansson | 411/378 |
| 3,717,067 | 2/1973 | Vick et al. | 411/455 |
| 3,987,698 | 10/1976 | Rabe | 411/455 |
| 4,096,901 | 6/1978 | Reichenbach | 411/412 X |
| 4,486,134 | 12/1984 | White | 411/178 X |

FOREIGN PATENT DOCUMENTS

| | | | |
|---|---|---|---|
| 213464 | 11/1956 | Australia | 411/412 |
| 2516734 | 11/1975 | Fed. Rep. of Germany | 411/378 |
| 2805071 | 9/1978 | Fed. Rep. of Germany | 411/389 |
| 545908 | 10/1922 | France | 411/455 |
| 414026 | 12/1946 | Italy | 411/424 |
| 290474 | 6/1965 | Netherlands | 49/505 |
| 213640 | 6/1967 | Sweden | 403/388 |
| 42138 | 2/1908 | Switzerland | 411/455 |
| 873960 | 8/1961 | United Kingdom | 411/455 |

Primary Examiner—Gary L. Smith
Assistant Examiner—Rodney M. Lindsey
Attorney, Agent, or Firm—Jacobs & Jacobs

[57] ABSTRACT

A screw, particularly a wood screw, has a screw shank that consists of a first section which is provided with a thread and extends to the one end of the screw and of a second section without thread which terminates in a screw head. At least one annular projection, arranged concentric to the axis of the screw shank, is provided on said second section of the shank.

2 Claims, 1 Drawing Sheet

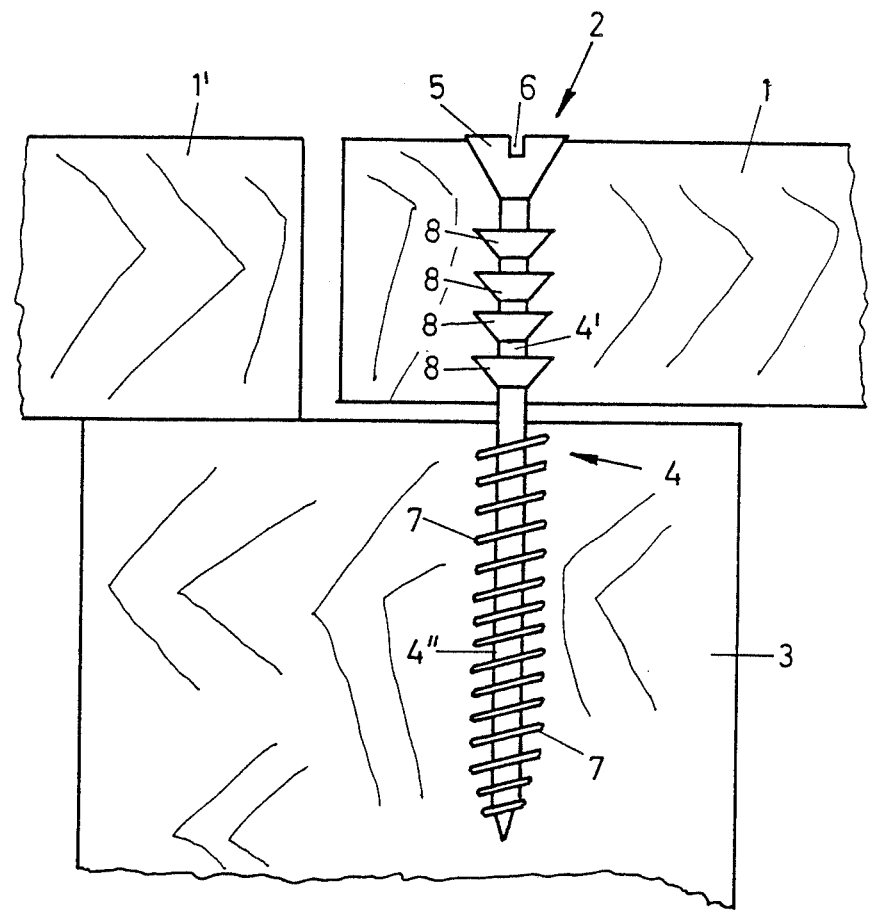

SCREW, PARTICULARLY WOOD SCREW

CROSS-REFERENCE

This is a continuation of Ser. No. 750,326 filed June 28, 1985 now abandoned.

BACKGROUND OF THE INVENTION

1. Field of the Invention

The present invention relates to a screw, particularly a wood screw, the shank of which consists of a first section which is provided with a thread and extends up to the one end of the screw and of a second section without thread which terminates in a screw head.

2. Description of Related Art

Numerous types of screws, in particular wood screws, are known.

When screwing parts to a supporting substrate or background (for instance to beams, frames, walls provided with dowels, etc.) the problem frequently arises that after they have been attached the parts should have their outer surfaces which are perpendicular or substantially perpendicular to the axes of the screws used extend in a common plane, i.e. be flush with each other, which frequently cannot be easily obtained due to tolerances in the dimensions of the materials used and because of the unavoidable tolerances upon assembly.

SUMMARY OF THE INVENTION

The object of the invention is to provide a screw, particularly a wood screw, by means of which it is possible, after the screw has been tightened, to adjust the corresponding part held by the screw by turning the screw slightly back in the axial direction of the screw without thereby impairing the quality of the screwed attachment.

In order to achieve this object, a screw of the above-described type is, in accordance with the invention, developed in such a manner that at least one annular projection which is concentric to the axis of the shank is provided on the second section of the shank.

Upon the screwing-in of the screw at least one annular projection pushes itself laterally into the material of the element to be attached by the screw so that the screw is then held fast in axial direction in the element to be attached by the annular projection. In this way, it is then possible for the screw, after having been once tightened, to be turned backward (in the direction of loosening but without impairing the quality of the screw fastening) so as to equalize or adjust the part secured by the screw, as a result of which the element is moved, together with the screw, with respect to the supporting substrate or backing which receives the thread of said screw without the screwed attachment being loosened.

Further developments of the invention form the object of the subordinate claims. The invention will be explained in further detail below with reference to the drawing. The sole FIGURE is a side view of a wood screw according to the invention.

DETAILED DESCRIPTION OF THE PREFERRED EMBODIMENT

In the FIGURE, 1 is a part consisting of wood, for instance a wooden lath, which is held on a wooden beam 3 by means of a wood screw 2 according to the invention. The wood screw 2, which is made of metal, for instance of steel, brass, etc., consists of a screw shank 4 which terminates at one end in the screw head 5, which is developed as a counter-sunk head. The screw head 5 is provided with a screwdriver slot 6 and can, for instance, also have the form of a Phillips screw head.

The screw shank 4 consists of two sections 4' and 4", the section 4", which lies further from the screw head 5 and forms the other end of the wood screw 2, being provided with a thread 7. The threadless section 4' of the shank, which lies between the thread 7 or shank section 4" and the screw head 5, has a cylindrical cross section which is smaller than the maximum outside cross section of the thread 7 on the section 4" of the shank. In the embodiment shown, four ring-like projections 8 which protrude beyond the circumferential surface of the shank section 4' and are closed in ring-like manner on themselves are provided on the section 4' of the shank, said projections being in each case concentric to the axis of the screw shank 4 and being arranged at equal distances apart, alongside each other in the longitudinal direction of the screw shank 4. The projections 8 are in each case of frustoconical development in the case of the embodiment shown and are so arranged that the sides thereof which taper in frustoconical form face the shank section 4" which is provided with the thread 7.

In order to attach one element, for instance the wood lath 1, to another element, for instance the wooden beam 3, the wood screw 2 is screwed in customary manner by a screwdriver into predrilled holes in the wooden lath 1 or possibly in the wooden beam 3, in such a manner that it is held fast in the wooden beam 3 by the section 4" of the shank which is provided with the thread 7, while the unthreaded section 4' of the shank is contained within the wooden lath 1. The screwing-in of the wood screw 2 is completed as soon as the wooden lath 1 is pressed firmly against the wooden beam 3, the screw head 5 then also resting firmly against the wooden lath 1 or against a countersunk hole provided therein. The projections 8, whose outside diameter is larger than the maximum outside diameter of the thread 7, press themselves laterally into the material of the wooden lath 1 upon the tightening of the wood screw 2.

If the side of the wooden lath 1 which faces away from the wooden beam 3 is to be flush with that side of another element 1' which also faces away from the wooden beam 3 and it is found that this is not true after the tightening of the wood screw 2 because the surface of the wooden lath 1 facing away from the wooden beam 3 is closer to the wooden beam 3 than the corresponding surface of the element 1', the wood screw can be turned back in the direction of loosening until both surfaces lie in the same plane. By the projections 8 which have impressed themselves into the material of the wooden lath 1, assurance is had that the wood screw 2 or its screw shank 4, while being turnable in the wooden lath 1, is nevertheless held therein in an axially non-displaceable fashion, so that upon the turning back of the wood screw 2 the firm attachment of the screw head 5 to the wooden lath 1 is retained. Due to the projections 8, the wooden lath 1 is still held as firmly as before by the wood screw and in particular also held fast without shaking on the wooden beam 3. Since the projections 8 have an outside diameter which is larger than the maximum outside diameter of the thread 7, assurance is furthermore had that, upon the screwing in of the wood screw 2, the projections 8 can impress themselves sufficiently deep into material of the wooden lath 1 which has not been impaired by the pre-drilling of the wooden lath 1 or by the thread 7.

The length of the section 4' of the screw shank is preferably equal to or greater than the thickness of the wooden lath 1, as seen in the direction of the length of the wood screw 2, so that the thread 7 engages solely into the wooden beam 3.

The invention has been described above on basis of one illustrative example. It is obvious that changes and modifications are possible without thereby departing from the inventive concept. The wood screw of the invention can, of course, be used not only for the fastening of wooden laths but, in general, for attaching different parts of the most different material into which the projections 8 can penetrate laterally.

I claim:

1. An arrangement comprising:
   (A) first and second wood elements adjustably positioned relative to each other; and
   (B) a one-piece screw device interconnecting the first and second wooden elements, said screw device including
      (i) an elongated screw shank having opposed ends,
         (a) said shank having a first section extending from one of said ends toward, but terminating short of, the other of said ends, said first section having a screw thread threadedly engaging only the first wooden element, and having a maximum outside diameter, and
         (b) said shank having a second unthreaded section extending from said other end toward, but terminating short of, said one end, said second section engaging only the second wooden element,
      (ii) a frusto-conically shaped screw head at said other end and engaging only the second wooden element, said head having a frusto-conically tapering wall facing toward said first section and means for enabling the screw device to be turned about an axis extending lengthwise along the shank, said first section being movable along the axis during turning of the screw device to adjustably position the first and second wooden elements relative to each other, and
      (iii) means on said second section for preventing movement of said second section along the axis during turning of the screw device, said preventing means having at least one annular projection on said second section between said screw head and said first section, said projection being aranged concentric to the axis and having a maximum outside diameter which is larger than the maximum outside diameter of the screw thread, said projection being frusto-conically shaped and having a single frusto-conical tapering side facing away from said screw head and rotatably engaging only said second element to permit only rotation in said second element during turning of the screw device.

2. The arrangement according to claim 1, wherein at least two projections are located on said second section.

* * * * *